(12) United States Patent
Kim et al.

(10) Patent No.: US 6,557,010 B1
(45) Date of Patent: Apr. 29, 2003

(54) METHOD AND APPARATUS FOR SEARCHING HUMAN THREE-DIMENSIONAL POSTURE

(75) Inventors: Nam Kyu Kim, Seoul (KR); Hae Kwang Kim, Seoul (KR)

(73) Assignee: Hyundai Electronics Industries Co, Ltd., Ichon-shi (KR)

( * ) Notice: Subject to any disclaimer, the term of this patent is extended or adjusted under 35 U.S.C. 154(b) by 309 days.

(21) Appl. No.: 09/655,036

(22) Filed: Sep. 5, 2000

(30) Foreign Application Priority Data

Sep. 8, 1999 (KR) .............................. 99-38054

(51) Int. Cl.[7] .............................................. G06F 17/30
(52) U.S. Cl. ................................................ 707/104.1
(58) Field of Search ................................ 707/3, 4, 6, 5, 707/10, 104.1, 500.1; 342/175, 179; 345/418, 419, 473, 619, 854; 382/128, 131; 600/117, 437; 700/98

(56) References Cited

U.S. PATENT DOCUMENTS

| | | | | |
|---|---|---|---|---|
| 5,787,279 A | * | 7/1998 | Rigoutsos | ................ 707/104.1 |
| 5,970,499 A | * | 10/1999 | Smith et al. | ................ 707/102 |
| 6,130,679 A | * | 10/2000 | Chen et al. | ................ 345/473 |
| 6,154,222 A | * | 11/2000 | Haratsch et al. | ............ 345/473 |
| 6,417,797 B1 | * | 7/2002 | Cousins et al. | ............. 342/175 |

FOREIGN PATENT DOCUMENTS

JP          11-250284          9/1999

* cited by examiner

*Primary Examiner*—Diane D. Mizrahi
*Assistant Examiner*—Apu M Mofiz
(74) *Attorney, Agent, or Firm*—Merchant & Gould, P.C.

(57) ABSTRACT

Disclosed is a method and apparatus for searching a human three-dimensional (3D) posture which can rapidly and accurately search a human 3D posture by effectively representing the human 3D posture with a small amount of data. According to the method, a posture database is established by extracting posture descriptors using relation among respective joints of a body, and a feature of a query 3D posture is simultaneously extracted in the same manner. Then, the similarity is calculated by comparing the posture descriptor of the query 3D posture with the posture descriptors of postures in the posture database, and then outputted to search the human 3D posture.

12 Claims, 8 Drawing Sheets

METHOD AND APPARATUS FOR SEARCHING HUMAN THREE-DIMENSIONAL POSTURE

BACKGROUND OF THE INVENTION

1. Field of the Invention

The present invention relates to a method and apparatus for searching human three-dimensional (3D) posture, and more particularly, the present invention relates to a method and apparatus for searching a human 3D posture which can extract posture descriptors from respective postures of human 3D models using relation among respective joints, and rapidly and accurately search a human 3D posture database using the posture descriptors.

2. Description of the Related Art

Recently, data searches have been performed mainly by a language-based search. However, with the recent development of the multimedia technique and the explosive growth of the Internet, a massive amount of multimedia data exists on Internet or in multimedia databases, and the development of methods of effectively searching multimedia data among multimedia data composed of a movie, synthetic image, still image, moving image, audio, music, etc., in addition to language is in progress.

Among the recent data searching methods, a method of searching a still image or moving image has been actively researched in accordance with the appearance of a virtual reality represented by the computer graphic technique and the development of the digital image compression technique based on the object-oriented coding technique. Especially, with the development of the computer and image processing technique, human 3D models in a virtual space have been diversely used for a realistic movie, game, advertisement, virtual circumstance on a network, etc., and thus the search of the human 3D posture is an important factor for the image search.

Since the human 3D posture data has a large amount of data and exists in diverse forms, it is impossible to search a desired 3D posture using the human 3D posture itself.

Accordingly, in order to search the human 3D posture, the search should be performed in a manner that a posture database is established by extracting features representing respective postures by pre-processing, and then the similarity is compared between the posture and a query 3D posture whose feature is extracted in the same manner. The comparison of the similarity can be performed by calculating the difference between the postures. The model representing the feature of the human 3D posture is called a posture descriptor.

As the posture descriptor representing the feature of the 3D image data generally used, there exist volume information for representing how wide 3D points are distributed in space, and histogram information for representing position information of the points as several divided groups. Such information, however, is not suitable for representing the human 3D posture by the feature for representing a general 3D model.

The most accurate method of representing the human 3D model represents the posture with point information constituting respective parts of a body, surface information for the respective points connected one another, and color information of the surface. According to this method, the amount of data for representing the human 3D posture becomes excessively large. If the amount of data becomes large, lots of storage space are required when the human 3D model data is processed on the computer, and it takes a long time for search, so that a rapid and effective search cannot be effected. Thus, in order to make an effective multimedia search possible, the development of an effective human 3D posture searching method is strongly required.

SUMMARY OF THE INVENTION

Accordingly, the present invention has been made in an effort to solve the problems occurring in the related art, and an object of the present invention is to provide a method and apparatus for searching a human 3D posture which enables a rapid and accurate database search by effectively representing the human 3D posture with a small amount of data.

It is another object of the present invention to provide a method and apparatus for searching a human 3D posture which can obtain a faithful search result in spite of the difference among human body shapes by using position information of the respective parts of the body applied to a standard body model.

In order to achieve the above objects, according to the present invention, there is provided a method of searching a human three-dimensional (3D) posture, comprising a posture descriptor extracting step of extracting a posture descriptor from a human query 3D posture using relation among respective joints of a human body, an other posture descriptor extracting step of extracting posture descriptors of human 3D models in a posture database in the same manner as the posture descriptor extracting step, a database establishing step of establishing the posture database with the posture descriptors of the human 3D models extracted at the previous step, a 3D model database establishing step of establishing a 3D model database using the human 3D models, a similarity comparing step of comparing an output query posture descriptor with the posture descriptors in the posture database, and a comparison result outputting step of outputting the 3D model database corresponding to the posture having the highest similarity in the posture database by indexing the similarity in accordance with a result of the similarity comparison at the previous step.

According to another aspect of the present invention, there is provided a method and apparatus for searching a human 3D posture using body animation parameters (BAP) that use rotating angles among neighboring joints connected one another in a 3D body as posture descriptors, or using BAP posture descriptors of a standard body model obtained by applying the BAP posture descriptors to the standard body model.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENT

Figure 1A:
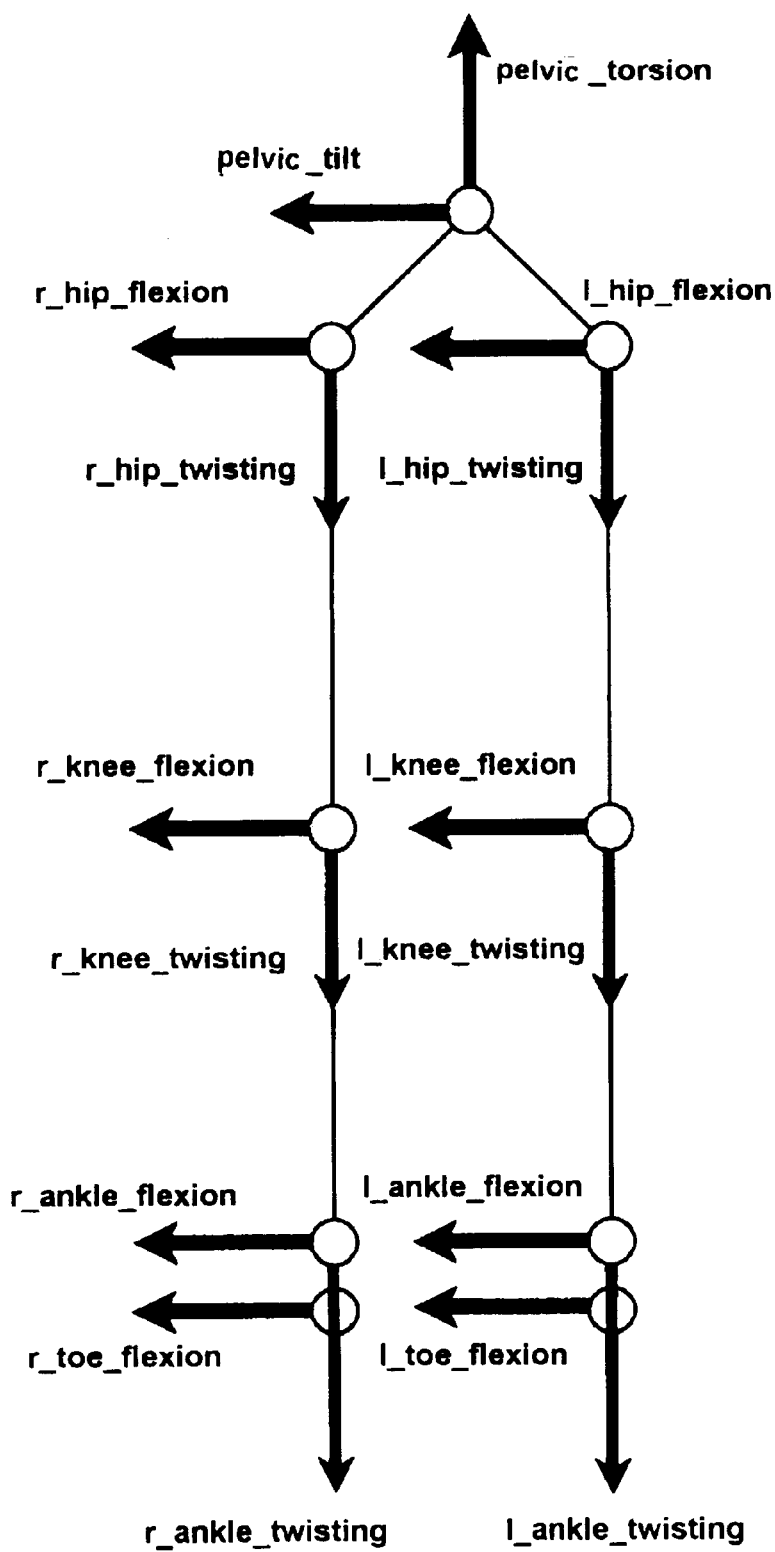
FIG. 1a is a front view of the BAP related to the movement of legs.

Reference will now be made in greater detail to the preferred embodiments of the present invention. In the drawings, the same or similar elements are denoted by the same reference numerals even though they are depicted in different drawings. In the following description of the present invention, a detailed description of known functions and configurations incorporated herein will be omitted when it may make the subject matter of the present invention rather unclear.

The human 3D posture searching method according to the present invention uses the relation among the respective joints as the posture descriptors representing the human 3D postures.

As an example for representing the relation among the respective joints, the present invention uses the body animation parameter (BAP) information as the posture descriptors, but in case of using the relation among the respective joints, used information is not necessarily limited to the BAPs. For the realization and animation of the human body, the BAPs are provided by modeling the movement of the human body as the whole movement of the body and rotating angles of the joints connected one another, and the positions of the prominent joints of the body are defined by the movement difference with respect to the basic posture. The difference of movement is represented by rotating angle information among the neighboring joints, and the rotating angles among the joints are indicated using 175 parameters.

Figure 1B:
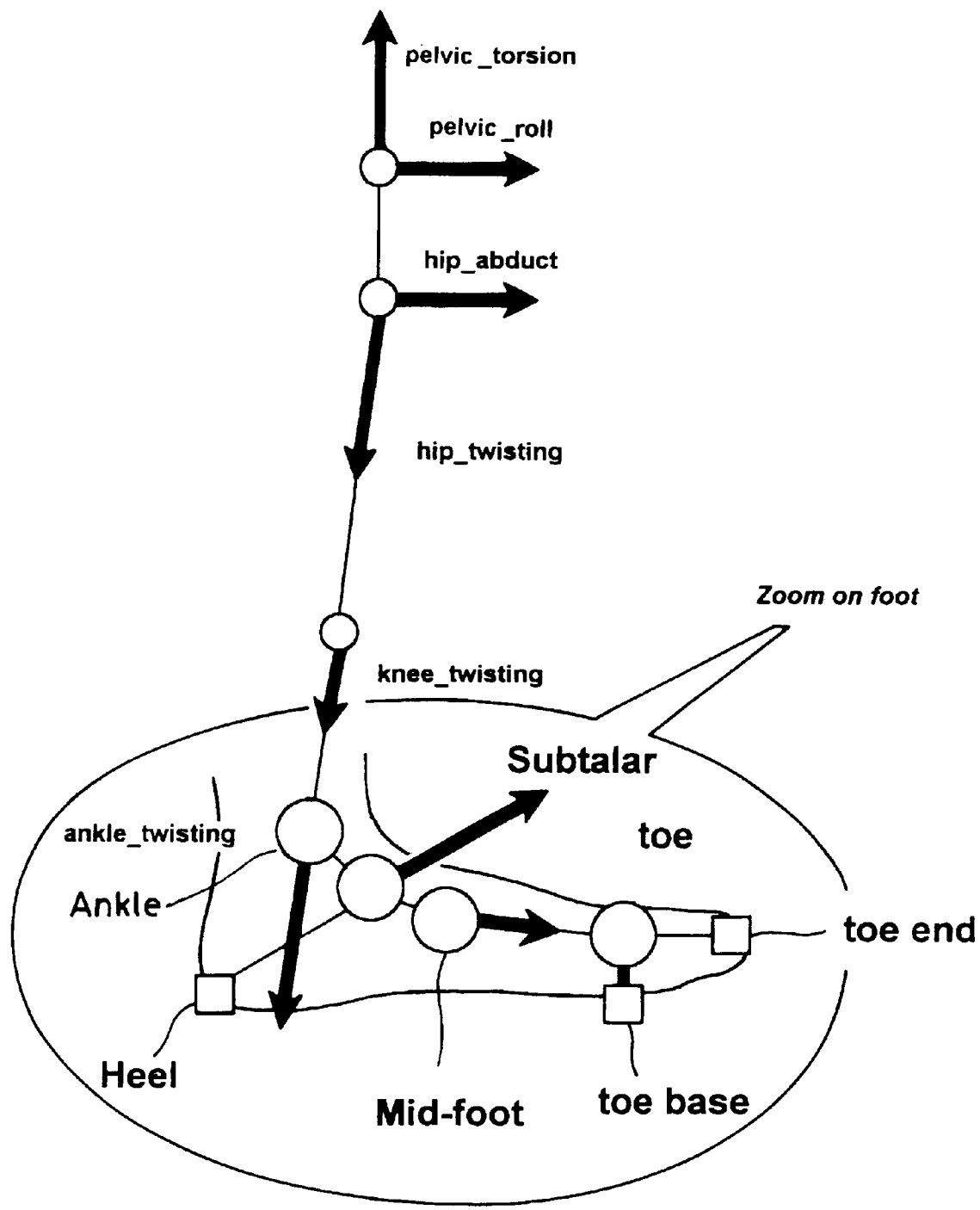
FIG. 1b is a side view of the BAP related to the movement of the leg.

FIG. 1a is a front view of the BAP related to movement of legs, and FIG. 1b is a side view of the BAPs related to movement of the leg. In FIGS. 1a and 1b, an arrow indicates a central axis of a rotating angle, and a circle indicates a joint of a body. For example, "r_hip_flexion" in FIG. 1a indicates information that a right leg rotates back and forth as a whole.

The feature representing the posture using BAPs, which are the movement differences and whose is n, can be expressed as follows:

Posture descriptor={
  Bap value [n];
};

To obtain the differences among the respective postures, a method of obtaining an absolute sum of the differences for the respective BAP values can be used as in the following equation 1.

$$Difference(Posture\ A, Posture\ B) = \sum_{i=1}^{n} |bap\_value_A[i] - bap\_value_B[i]| \quad \text{[Equation 1]}$$

The method of searching the human 3D posture using the posture descriptors as described above according to the preferred embodiment of the present invention will now be explained. In case of querying with the human 3D posture, the human 3D postures used for a movie, advertisement, game, etc. are described as the posture descriptors using the relation among the respective joints. Then, a posture database is established using the human 3D postures, and 3D models corresponding to the 3D postures are stored in a 3D model database. In other words, the 3D posture values in the posture database are connected to the corresponding 3D model values in the 3D model database one by one. In case of querying with the 3D posture, the posture descriptor is extracted from the query posture in the same manner as in the posture database establishment, similar postures are searched by comparing the similarity between the extracted posture descriptor and posture descriptors stored in the posture database, and then the searched 3D postures are outputted through an output device using the values stored in the 3D model database.

The present invention provides several methods for extracting the posture descriptors. The preferred one among them directly uses the BAPs which are the rotating angle information of the neighboring joints connected one another in the 3D human body as shown as "(A)" in FIG. 4.

However, the method directly using the BAP values as described above has some defects as follows.

First, the similar postures may have different BAP values. For example, in case of the leg postures, the posture having the "1_hip_flexion" BAP value of 0 degree and having the "1_hip_abduct" BAP value of 90 degrees and the posture having the "1_hip_flexion" BAP value of 180 degrees and having the "1_hip abduct" BAP value of 90 degrees indicate the similar posture that the leg is stretched to the side. However, in comparing the similarity, the difference value becomes large therebetween.

Figure 2A:
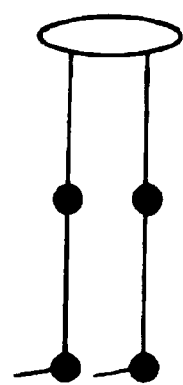
FIGS. 2a to 2c are views comparatively explaining the BAP calculation result according to the posture of the legs in an embodiment using the BAP directly.
Figure 2B:
Figure 2C:

Second, since the BAP values represent the rotating angles among the joints only, the relation information among the respective body parts cannot be accurately represented. When a human recognizes the posture, he/she not only observes the respective parts of the body separately but also recognizes relation among the respective parts. Thus, the relation information among the respective body parts, for example, such that the right arm is raised and the left arm gets down, or both the right and left arms face the same direction, is important. FIGS. 2a to 2c illustrate leg postures. FIG. 2a shows the posture that the two legs are stretched down, FIG. 2b shows the posture that the two legs are stretched forth, and FIG. 2c shows the posture that the right leg faces the forth and the left leg faces the back. The difference between the posture of FIG. 2a and that of FIG. 2b is 180 degrees in total since the BAP difference between the left legs is 90 degrees and the BAP difference between the right legs is 90 degrees.

The total difference between the posture of FIG. 2b and that of FIG. 2c also appears to be 180 degrees. If the relation among the respective parts of the body is not considered, it cannot be represented that the similarity between the postures of FIGS. 2a and 2b is larger than that between the postures of FIGS. 2a and 2c. That is, if only the BAP values are directly used as the posture descriptors, the features of the diverse postures of the human body cannot be minutely compared.

Figure 3:
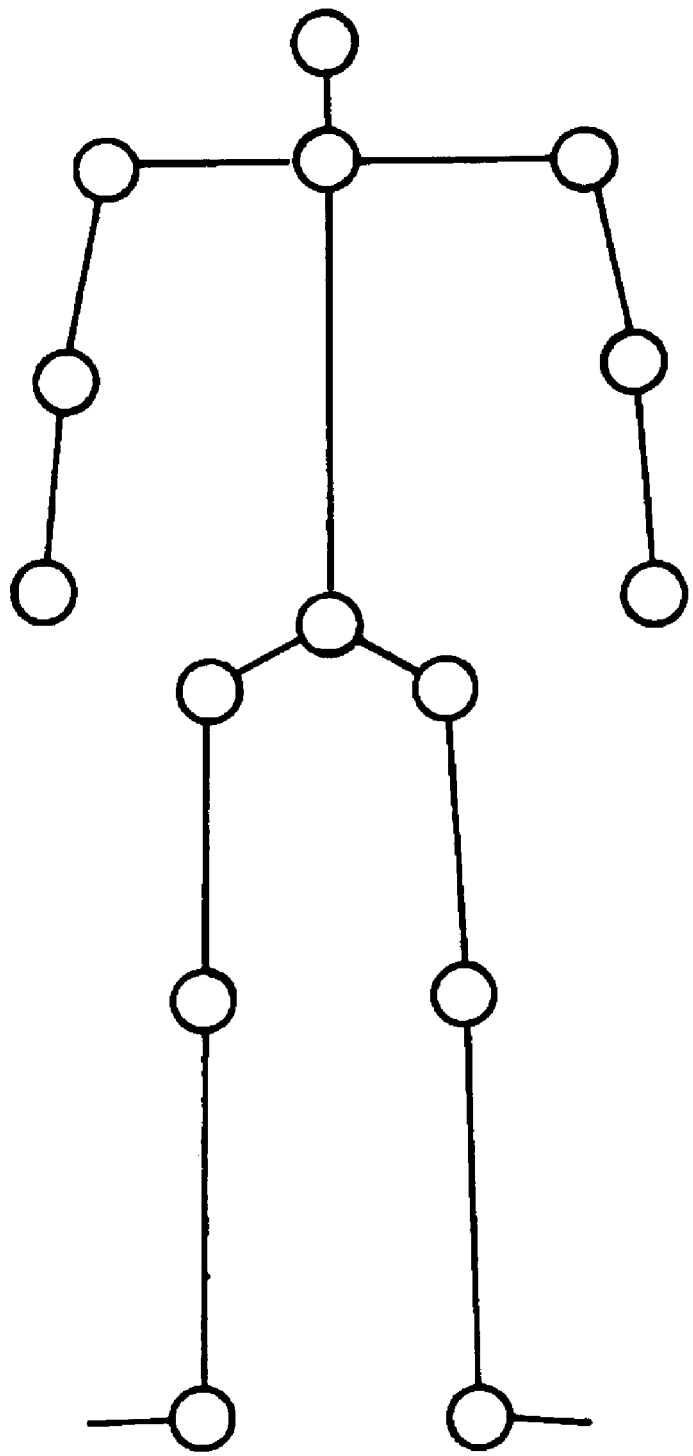
FIG. 3 is a view explaining the minimum number of joints of the human body for extracting the posture descriptors according to the present invention.
Figure 4:
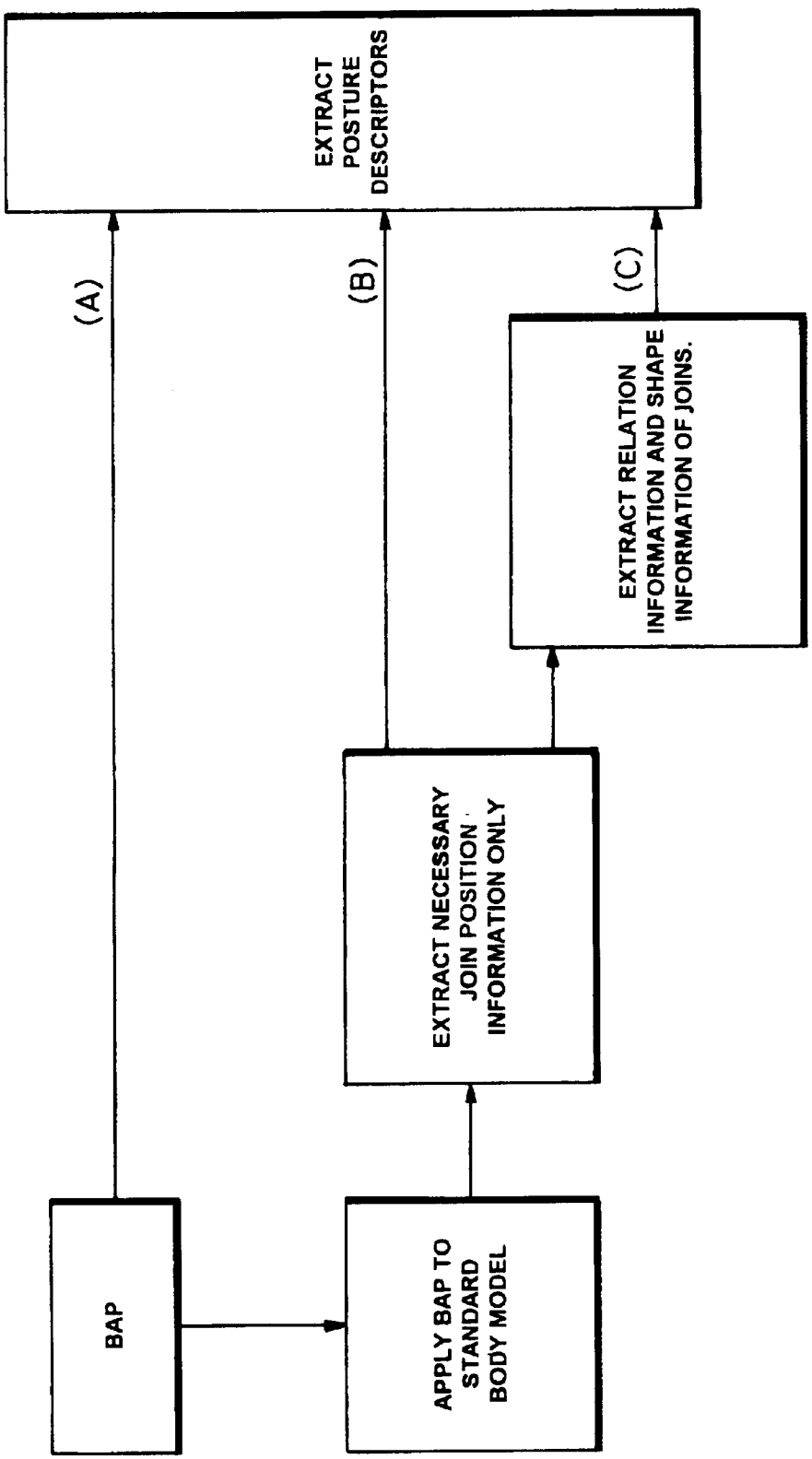
FIG. 4 is a view illustrating the posture descriptor extracting process of the 3D posture searching method according to various embodiments of the present invention, wherein "A" represents the embodiment that uses the BAP directly, "B" represents the embodiment that extracts position information of joints of a human body by applying the BAP to the standard body model, and "C" represents the embodiment that extracts relation information among joints and shape information of the joints in addition to position information of the joints by applying the BAP to the standard body model.

In order to make up for the above-described defects, the second embodiment of the present invention obtains the positions of the respective joints in the standard body model by applying the BAPs to the standard body model, and uses the positions as the feature of the posture (see "(B)" of FIG. 4), rather than directly using the BAPs. According to the present invention, the same position information can be obtained for the same posture for each model not by applying the BAPs to the general human 3D model, but by applying the BAPs to the standard body model. That is, the absolute positions become different due to the differences of the body shapes of the models such as tall, short, thin, fat, etc., but the same position information can be obtained by applying the standard body model. Specifically, the posture descriptors can be obtained by extracting only the information corresponding to the minimum number of joints which can express the human body as shown in FIG. 3, and then extracting the position information of the respective joints ("B" in FIG. 4). Also, the relation information between the important parts of the body such as head and body, body and arm, and body and leg, or the shape information of the arm and leg can be obtained and used as the posture descriptors by extracting directions of the respective joints from the positions thereof ("C" in FIG. 4). For example, the position information of the joint can be expressed by vector, and the relation among the respective parts of the body expressed by an angle among vectors representing the respective joints. Also, in case of the arm and leg, the shape information can be used in addition to know the shape of the arm and leg only. The shape of the arm or leg can be represented by the angle information of the arm or leg.

The information extracted from the respective parts of the body is the posture descriptors composed of the relation among the important parts of the body, and can be expressed by the following equation.

Posture descriptor={
  Head joint position information
  Body joint position information, etc.
  Arm (
    Joint position information
    Relation information between left arm and right arm
    Shape information of arm
  }
    Leg {
      Joint position information
      Relation information between left leg and right leg
      Shape information of leg
    }
Relation information}
  Relation information between head and body
  Relation information between body and leg, etc.
}
};

According to the present invention, the methods of extracting the posture descriptor by applying the BAPs to the standard body model are not limited to the above-described methods. In addition, various methods such as a method of dividing the body into the upper half and lower half of the body, and hierarchically adding thereto detailed information may be provided.

At the step of comparing the similarity between the query posture and the posture descriptors in the posture database, the difference values of, the posture descriptors can be calculated by directly summing the difference values, or by obtaining the differences of the relation information among the head, body, arm, leg, and other parts of the body and differently determining their weighted values. Specifically, the similarity (difference) can be obtained by multiplying head information difference, body information difference, arm information difference, leg information difference, and relation information difference by a head information weighted value, body information weighted value, arm information weighted value, leg information weighted value, and relation information weighted value determined according to need, respectively, and summing the resultant multiplied values. As an example of obtaining the difference information by giving the weighted values, in case of the search with only the leg information, a large weighted value is given to the leg information, and no weighted value is given to other information (head, body, arm, and relation information.

Also, in case of calculating the difference between the arm and leg information, the weighted values are determined according to the weights of the respective information by obtaining the position information difference of the joints, relation information difference between the right and left arms or between the left and right legs, and shape information difference, multiplying them by the position information weighted value, relation information weighted value, and shape information weighted value, respectively, and summing the multiplied values.

If the similarity is indexed in the similarity comparing process as described above, an actual 3D model corresponding to the posture ranked as having the highest weighted value among postures in the posture database is displayed or outputted through an output device.

Figure 5:
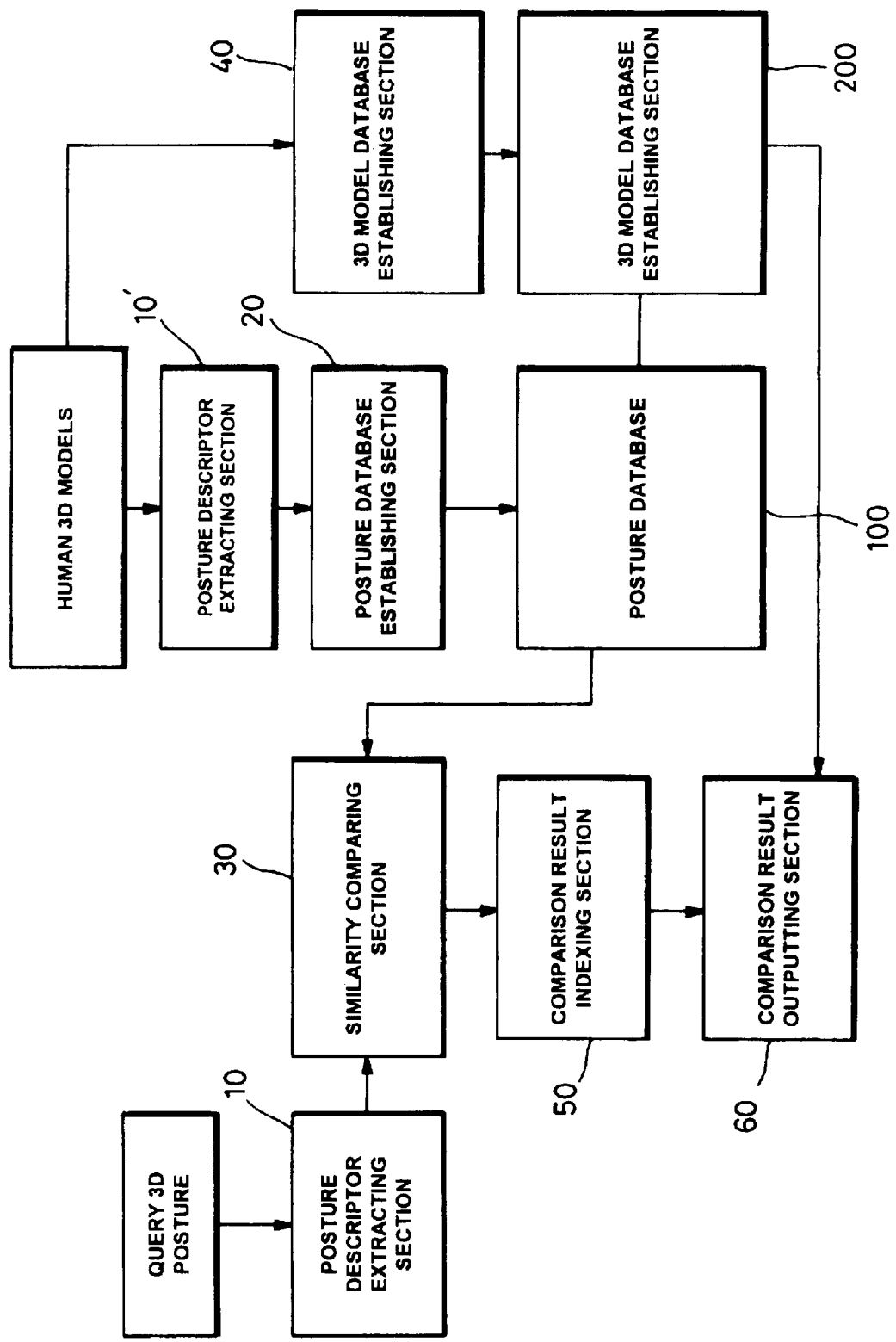
FIG. 5 is a block diagram of the human 3D posture searching apparatus according to an embodiment of the present invention.

The apparatus for searching the human 3D posture according to the present invention can be implemented in diverse forms. The apparatus for searching the human 3D posture according to the preferred embodiment of the present invention will be explained with reference to FIG. 5. The human 3D posture searching apparatus according to the present invention includes a posture descriptor extracting section 10 for receiving a query 3D posture, and extracting a posture descriptor from the query 3D posture using relation among respective joints of a human body, and another posture descriptor extracting section 10' for extracting posture descriptors of respective postures of human 3D models by the same operation as the posture descriptor extracting section. A posture database establishing section 20 establishes a posture database 100 with the posture descriptors of the human 3D models extracted from the posture descriptor extracting section 10', and a similarity comparing section 30 compares a similarity by a difference between the query posture descriptor outputted from the query posture descriptor extracting section 10 with the posture descriptors in the posture descriptor database 100. A 3D model database establishing section 40 establishes a 3D model database 200 with human 3D models. The comparison result from the similarity comparing section 30 is inputted to a comparison result indexing section 50, and the comparison result indexing section 50 indexes the postures in the posture database 100 according to a size of the similarity based on the inputted comparison result. A comparison result outputting section 60 brings out from the 3D model database 200 and outputs the 3D model which corresponds to the posture ranked to have the highest similarity by the comparison result indexing section 50.

The posture descriptor extracting sections 10 and 10' in the human 3D posture searching apparatus according to the present invention can be implemented in diverse forms. In the preferred embodiment of the present invention, the posture descriptor extracting section extracts BAPs representing rotating angles among neighboring joints connected one another in the human body as the posture descriptor.

In another embodiment of the present invention, the human 3D posture searching apparatus receives the query 3D posture, and extracts as the posture descriptors position information of the joints of the standard body model obtained by applying the BAPs to the standard body model. In this embodiment, the posture descriptor extracting sections 10 and 10' may be a device for extracting position information of the minimum number of joints by applying the BAPs to the standard body model, or a device for extracting position information of the minimum number of joints by applying the BAPs to the standard body model and extracting and using as the posture descriptors the relation information of respective parts of the human body and shape information of joints of an arm and leg.

Figure 6:
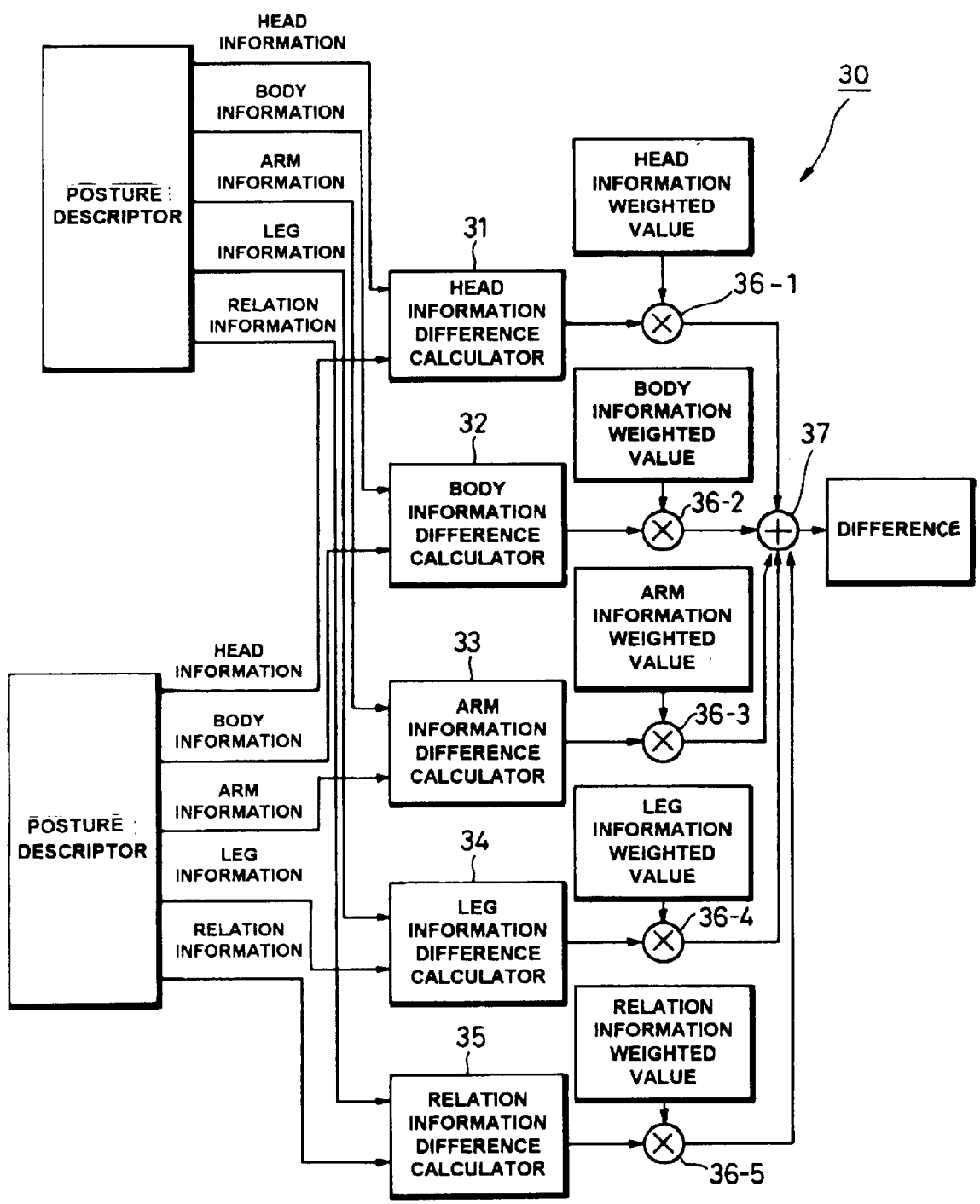
FIG. 6 is a view illustrating a posture descriptor similarity comparing section in the human 3D posture searching apparatus of FIG. 5 according to an embodiment of the present invention.

FIG. 6 shows the construction of the similarity comparing section 30 for comparing the similarity between the query posture and the postures in the database 100 according to an embodiment of the present invention. The similarity comparing section 30 includes a head information difference calculator 31, body information difference calculator 32, arm information difference calculator 33, leg information difference calculator 34, and relation information difference calculator 35. They receive the query 3D posture and the posture descriptors of the postures in the posture database 100, and calculate the head information difference, body information difference, arm information difference, leg information difference, and relation information difference between the query 3D posture and the posture descriptors. Multipliers 36-1 to 36-5 multiply the calculation results of the difference calculators 31 to 35 by predetermined weighted values, respectively, and a summer 37 sums the calculation results multiplied by the weighted values, and the summed value is outputted as the final difference (similarity).

The arm information difference calculator 33 and leg information difference calculator 34 in the searching apparatus according to the present invention are implemented considering all the position information difference, relation information difference, and shape information difference of the joints.

Figure 7:
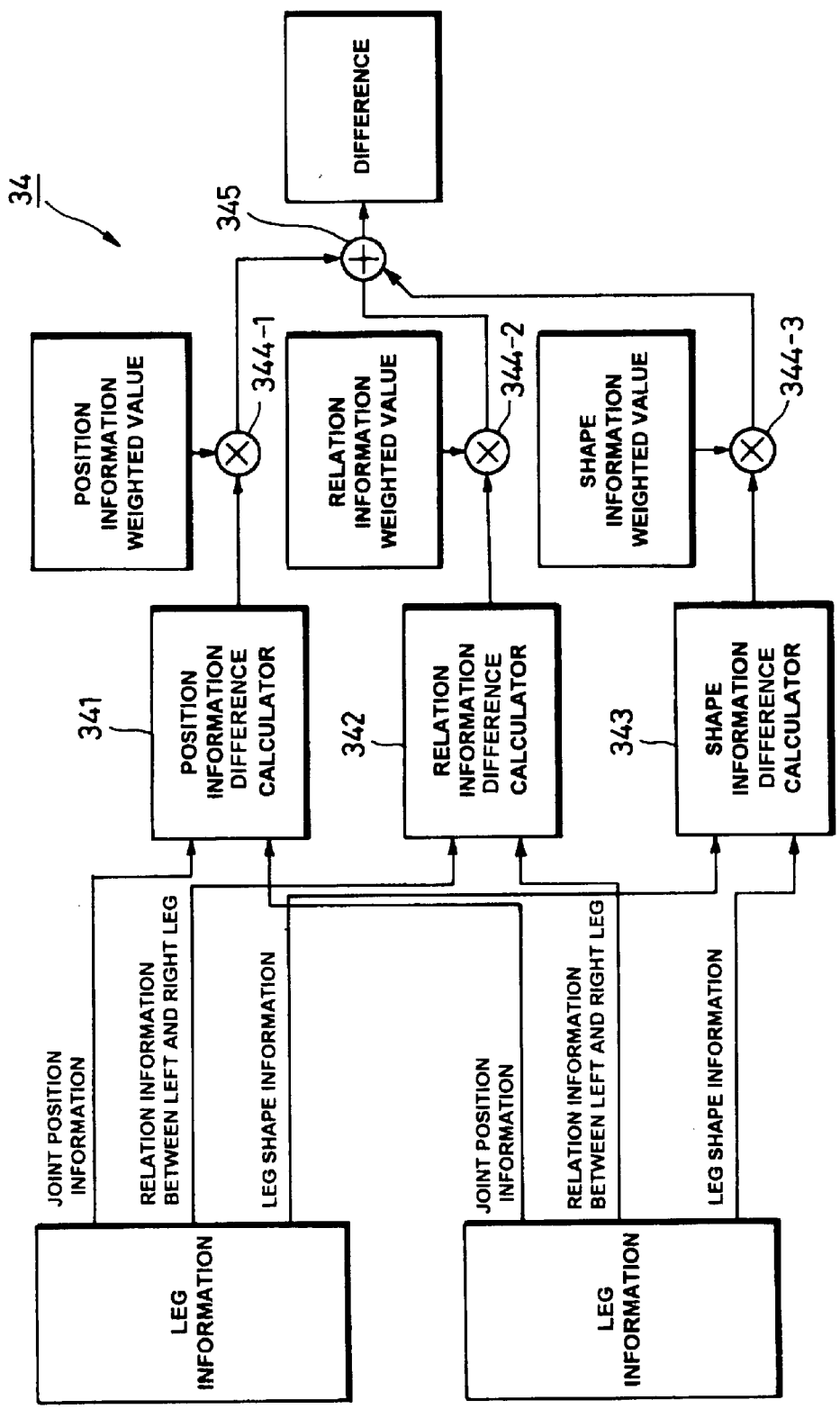
FIG. 7 is a view illustrating a leg information difference calculator in the similarity comparing section of FIG. 6 according to an embodiment of the present invention.

FIG. 7 shows the construction of the leg information difference calculator 34 according to an embodiment of the present invention. The leg information difference calculator 34 of FIG. 7 comprises a position information difference calculator 341 for calculating a joint position difference from the leg information between the query 3D posture and the postures in the posture database 100, a relation information difference calculator 342 for calculating a relation information difference from the relation information of the left and right legs, and a shape information difference calculator 343 for calculating a shape information difference from the shape information of the leg. The leg information difference calculator 34 may include multipliers 344-1 and 344-3 for multiplying the respective difference values by the weighted values, and a summer 345 for obtaining the difference (similarity) by summing the difference values multiplied by the weighted values. If the leg information difference is obtained by the leg information difference calculator 34 as above, the multiplier 36-4 multiplies the difference value by the weighted value, and the summer 37 sums the calculated values multiplied by the weighted values to output the difference of the whole posture.

As described above, the human 3D posture searching method and apparatus according to the present invention enables a rapid and accurate 3D posture search by representing the human 3D posture with the BAP values only or by using the position information of the standard body joints obtained by applying the BAP values to the standard body model, relation information among the respective joints, and shape information of the joints. Further, the human 3D posture searching method and apparatus can obtain a faithful search result in spite of the differences among the human body shapes by using the position information of the respective parts of the body applied to the standard body model.

While this invention has been described in connection with what is presently considered to be the most practical and preferred embodiments, it is to be understood that the invention is not limited to the disclosed embodiments, but, on the contrary, it is intended to cover various modifications within the spirit and scope of the appended claims.

What is claimed is:

1. A method of searching a human three-dimensional (3D) posture, comprising:

a posture descriptor extracting step of extracting a posture descriptor from a human query 3D posture using relation among respective joints of a human body;

an other posture descriptor extracting step of extracting posture descriptors of human 3D models in a posture database in the same manner as the posture descriptor extracting step;

a database establishing step of establishing the posture database with the posture descriptors of the human 3D models extracted at the previous step;

a 3D model database establishing step of establishing a 3D model database using the human 3D models;

a similarity comparing step of comparing an output query posture descriptor with the posture descriptors in the posture database; and a comparison result outputting step of outputting the 3D model database corresponding to the posture having the highest similarity in the posture database by indexing the similarity in accordance with a result of the similarity comparison at the previous step.

2. The method as claimed in claim 1, wherein body animation parameters (BAPS) representing rotating angles among neighboring joints connected one another in a 3D body are used as the posture descriptors.

3. The method as claimed in claim 2, wherein position information of a standard body model obtained by applying the BAPs to the standard body model is used as the posture descriptors.

4. The method as claimed in claim 3, wherein relation information among respective parts of the body and shape information of an arm or leg is used as the posture descriptors in addition to the position information of the respective joints obtained by applying the BAPs to the standard body model.

5. The method as claimed in claim 1, wherein the similarity comparing step includes the step of comparing the posture similarity by multiplying a head information difference, body information difference, arm information difference, leg information difference, and relation information difference between respective parts of the body by a head information weighted value, body information weighted value, arm information weighted value, leg information weighted value, and relation information weighted value determined according to search of weights of the respective posture descriptors, respectively, and summing the respective differences multiplied by the respective weighted values.

6. The method as claimed in claim 5, wherein the arm information difference and leg information difference calculation process obtains the difference by summing the position information difference, relation information difference, and shape information difference of the respective joints multiplied by the position information weighted value, relation information weighted value, and shape information weighted value, respectively.

7. An apparatus for searching a human three-dimensional (3D) posture comprising:

a posture descriptor extracting section for receiving a query 3D posture, and extracting a posture descriptor from the query 3D posture using relation among respective joints of a human body;

another posture descriptor extracting section for extracting posture descriptors of respective postures of human 3D models by the same operation as the posture descriptor extracting section;

a posture database establishing section for receiving posture descriptor data of the human 3D models from the posture descriptor extracting section and establishing a posture database;

a similarity comparing section for comparing a difference between the posture descriptor of the query posture and the posture descriptors in the posture descriptor database; a 3D model database establishing section for establishing a 3D model database with human 3D models, and connecting the posture descriptor values in the posture database to the corresponding human 3D model values in the 3D model database, respectively;

a comparison result indexing section for receiving comparison results from the similarity comparing section, and indexing the postures in the posture database according to a size of the similarity; and a comparison result outputting section for bringing out from the 3D model database, and outputting the 3D model which corresponds to the posture ranked to have the highest similarity by the comparison result indexing section.

8. The apparatus as claimed in claim 7, wherein the posture descriptor extracting section is a device for extracting body animation parameters (BAPs) representing rotating angles among neighboring joints connected one another in a 3D body.

9. The apparatus as claimed in claim 8, wherein the posture descriptor extracting section is a device for extracting position information of the respective joints obtained by applying the BAPs to the standard body model as the posture descriptors.

10. The apparatus as claimed in claim 9, wherein the posture descriptor extracting section is a device for extracting relation information among respective parts of the body and shape information of an arm or leg in addition to the position information of the respective joints obtained by applying the BAPs to the standard body model.

11. The apparatus as claimed in claim 7, wherein the similarity comparing section comprises a head information difference calculator, body information difference calculator, arm information difference calculator, and leg information difference calculator, and relation information difference calculator for calculating differences between head information, body information, arm information, leg information, and relation information of the body, respectively, weighted value multipliers for multiplying calculated values of the respective difference calculators by determined weighted values, respectively, and a summer for calculating a final similarity by summing the calculated difference values multiplied by the weighted values, respectively.

12. The apparatus as claimed in claim 11, wherein the leg information difference calculator and the arm information difference calculator include:

a position information difference calculator for calculating a joint position difference from the leg or arm information between the query 3D posture and the postures in the posture database;

a relation information difference calculator for calculating a relation information difference from the relation information between the left leg and right leg or between the left arm and the right arm;

a shape information difference calculator for calculating a shape information difference from the shape information of the leg or arm;

multipliers for multiplying the respective difference values by the weighted values; and a summer for obtaining the similarity by summing the difference values multiplied by the weighted values.

* * * * *